(12) United States Patent
Ng (10) Patent No.: US 7,308,470 B2
(45) Date of Patent: Dec. 11, 2007

(54) SMALLER AND LOWER POWER STATIC MUX CIRCUITRY IN GENERATING MULTIPLIER PARTIAL PRODUCT SIGNALS

(75) Inventor: Kenneth Y. Ng, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 10/728,395

(22) Filed: Dec. 5, 2003

(65) Prior Publication Data

US 2005/0125478 A1    Jun. 9, 2005

(51) Int. Cl.
*G06F 7/52* (2006.01)
(52) U.S. Cl. .................................... 708/628
(58) Field of Classification Search ................ 708/628
See application file for complete search history.

(56) References Cited

U.S. PATENT DOCUMENTS

| | | | |
|---|---|---|---|
| 5,818,743 A | 10/1998 | Lee et al. | |
| 5,880,985 A | 3/1999 | Makineni et al. | 364/757 |
| 5,917,741 A | 6/1999 | Ng | 364/748.03 |
| 5,943,250 A * | 8/1999 | Kim et al. | 708/625 |
| 6,035,316 A | 3/2000 | Peleg et al. | 708/523 |
| 6,035,318 A | 3/2000 | Abdallah et al. | 708/628 |
| 6,055,555 A | 4/2000 | Boswell et al. | 708/551 |
| 6,065,032 A * | 5/2000 | Nicol | 708/628 |
| 6,173,304 B1 | 1/2001 | Goldovsky | 708/630 |
| 6,240,438 B1 * | 5/2001 | Goto | 708/630 |
| 6,269,384 B1 | 7/2001 | Oberman | 708/497 |
| 6,275,842 B1 | 8/2001 | Nicol | 708/620 |
| 6,286,023 B1 | 9/2001 | Purcell et al. | 708/620 |
| 6,301,599 B1 | 10/2001 | Chehrazi et al. | 708/628 |
| 6,308,195 B1 | 10/2001 | Hirase et al. | |
| 6,393,454 B1 * | 5/2002 | Chu | 708/630 |
| 6,460,065 B1 | 10/2002 | Purcell | 708/606 |
| 6,535,902 B2 | 3/2003 | Goto | |
| 6,684,236 B1 | 1/2004 | Farnbach | |
| 6,721,774 B1 | 4/2004 | Lee et al. | |
| 7,069,290 B2 * | 6/2006 | Garrett et al. | 708/625 |
| 7,096,246 B2 * | 8/2006 | Ferroussat | 708/628 |
| 2003/0158880 A1 | 8/2003 | Ng | 708/628 |

OTHER PUBLICATIONS

"Booth Recoding", *ASIC Design for Signal Processing*, Available at http://www.geoffknagge.com/fyp/booth.shtml, 4 pages.
Cooper, A. R., "Parallel Architecture Modified Booth Multiplier", *IEEE Procedings G—Circuits, Devices, and Systems*, 135(3), (Jun. 1988),125-128.

(Continued)

*Primary Examiner*—Tan V. Mai
(74) *Attorney, Agent, or Firm*—Schwegman, Lundberg & Woessner, P.A.

(57) ABSTRACT

A multiplier circuit to receive a multiplier and a multiplicand comprises at least one Booth encoder circuit to encode a plurality of multiplier bits into four encoded outputs. The encoded outputs select Booth-multiply functions. The circuit also includes a plurality of multiplexer circuits, one multiplexer circuit for each bit of the multiplicand. The at least one of the plurality multiplexer circuits includes four pass gates coupled to receive a multiplicand bit, a complement of the multiplicand bit, multiplexed data from a next lower order multiplexer circuit and the encoded outputs of the Booth encoder circuit outputs to provide one bit of a partial product at a multiplexer output.

25 Claims, 8 Drawing Sheets

OTHER PUBLICATIONS

Fried, R., "Minimizing Energy Dissipation in High-Speed Multipliers", *Proceedings of the 1997 International Symposium on Low Power Electronics and Design (ISLPED '97)*, (Aug. 1997), 214-219.

Goldovsky, A., et al., "Design and Implementation of a 16 by 16 Low-Power Two's Complement Multiplier", *Proceedings, IEEE International Symposium on Circuits and Systems (ISCAS 2000)*, (May 28-31, 2000), 345-348.

* cited by examiner

SMALLER AND LOWER POWER STATIC MUX CIRCUITRY IN GENERATING MULTIPLIER PARTIAL PRODUCT SIGNALS

BACKGROUND

Computer multiplication circuits accept a multiplicand and a multiplier and generate a product. One straightforward method to multiply binary numbers is the long form of multiplication. This is the standard shift-and-add approach. That is, for each column in a multiplier, shift the multiplicand the appropriate number of columns and add the shifted multiplicand into the final total if the multiplier column contains a one, or don't add it if the if the multiplier column contains a zero. The shifted numbers to be added are called partial products because they represent intermediate results in determining the final product of the multiply. All of the partial products are added together to determine the final product. Thus, the number of shifts to be executed is equal to the number of columns in the multiplier, and the number of partial products to be added is equal to the number of ones in the multiplier.

This method of multiplying is slow and there have been methods developed to speed up the multiplying process. One method to speed up multiplying is to use radix-four multiplication or Booth multiplication. Instead of shifting and adding for every column of the multiplier, the method uses every other column. Booth encoding involves looking at three consecutive bits of a multiplier to determine whether to multiply the multiplicand by −1, +1, −2, +2, or zero to obtain a partial product. This method reduces the number of partial products to be added by one-half, and consequently reduces the complexity and power consumption of circuits that implement the method.

The Booth encoding process consists of looking at three bits of a multiplier to determine how to calculate a partial product. As an example the hexadecimal number 4E2 is shown below.

010011100010_

In long multiplication by the shift and add method, twelve partial products would be used to determine the final product. To determine the partial products for Booth encoding, the number is grouped into the three-bit blocks. The least significant block begins with only the two least significant bits of the multiplier and zero is used as the least significant bit (LSB) of the block. Grouping starts at the LSB and each block overlaps the previous block by one bit. The most significant block is sign extended if necessary to fill out a block. Based on the three bits in the block, the multiplicand is multiplied by −1, +1, −2, +2, or 0 to obtain the partial product. Table 1 shows the encoding used for each possible three-bit block.

TABLE 1

| Bit Block | Partial product |
|---|---|
| 000 | 0 * Multiplicand |
| 001 | +1 * Multiplicand |
| 010 | +1 * Multiplicand |
| 011 | +2 * Multiplicand |
| 100 | −2 * Multiplicand |
| 101 | −1 * Multiplicand |
| 110 | −1 * Multiplicand |
| 111 | 0 * Multiplicand |

Starting with the LSB in the example above, the six blocks are 100, 001, 100, 111, 001 and 010. The multiplicand is then multiplied by −2, +1, −2, 0, +1 and +1 to obtain the six partial products. The partial products are shifted according to which block is decoded and then added together to obtain the final product.

Despite reducing the number of partial products by one-half, Booth multiplication can still result in complex circuits. Typically, computers that want to obtain the result of a multiply as quickly as possible use a circuit to calculate each bit of the partial products. So, for example, a 64-bit by 64-bit multiply that uses the shift and add method needs to add 64 partial products of 64 bits each; or 4096 circuits. A 64-bit by 64-bit multiply that uses Booth encoding reduces the number of partial products to be added by one-half. However, this method still requires adding 32 partial products of 64 bits each; or 2048 circuits.

It can be seen from this discussion that reducing the complexity of multiply circuits would result in significant savings of space used in fabricating the circuits and saving of power consumption in the operation of such circuits.

BRIEF DESCRIPTION OF THE DRAWINGS

In the drawings like numerals refer to like components throughout the several views.

DETAILED DESCRIPTION

In the following detailed description, reference is made to the accompanying drawings which form a part hereof, and in which is shown by way of illustration specific embodiments in which the invention may be practiced. It is to be understood that other embodiments may be used and structural changes may be made without departing from the scope of the present invention.

This document describes circuits to generate partial products for multiplication. The partial products are generated for a type of multiplication known as radix-four multiplication, or Booth multiplication.

Figure 1:
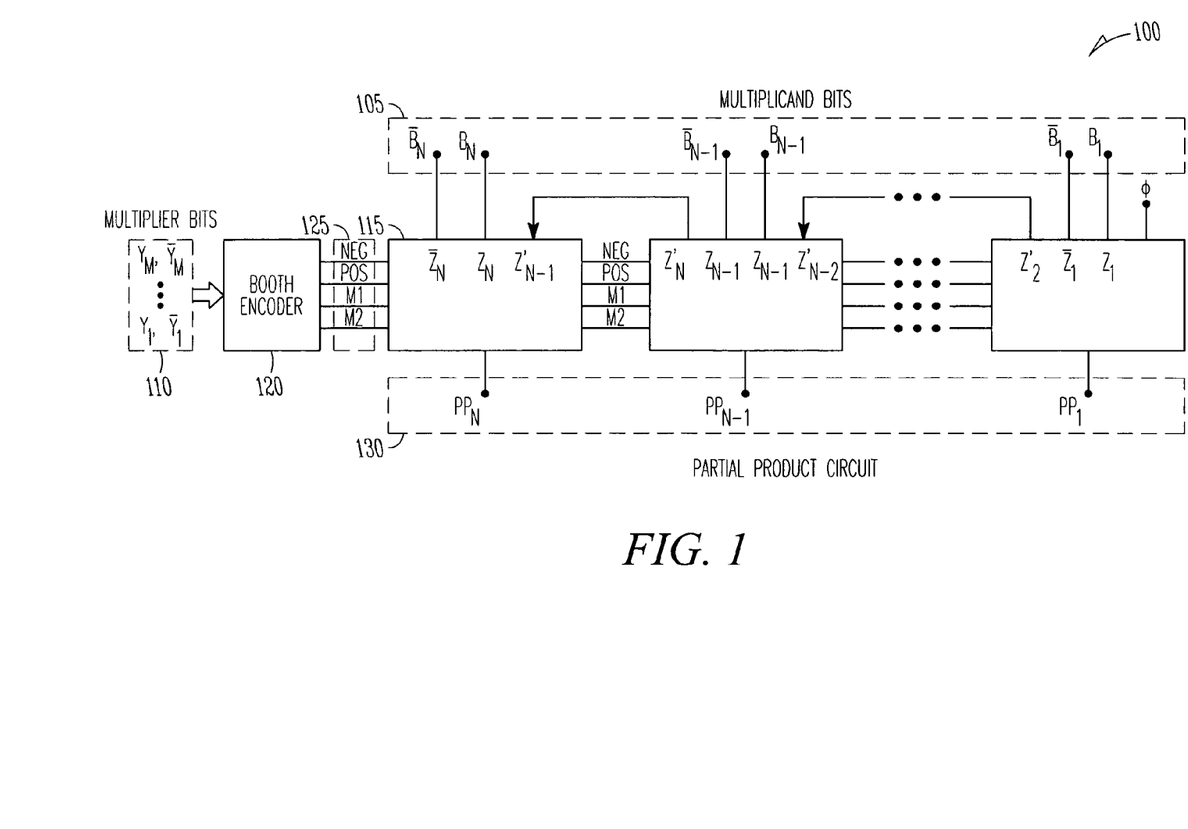
FIG. 1 is a block diagram of an embodiment of a circuit to generate one partial product for a Booth multiply.

To generate the partial products, multiplexing can be used. In multiplexing, signals corresponding to the Booth-multiply functions of multiply by 0, −1, +1, −2, and +2 are used to select a bit for output from the multiplexer. FIG. 1 is a block diagram of an embodiment of a circuit 100 to generate one partial product for a Booth multiply. Inputs to the partial product circuit 100 are bits of the multiplicand 105, their complements, bits of the multiplier 110 and their complements. The circuit 100 includes multiplexers 115. There is one multiplexer 115 for each bit of the multiplicand 105. The multiplier bits 110 are encoded using Booth encoder circuit 120 to generate Booth control signals 125. The Booth control signals 125 are distributed to multiplexers 115 to select outputs to generate bits of the partial product 130. The Booth control signals 125 include signals to generate a negative result (NEG), a positive result (POS), a multiply by one (M1) and a multiply by two (M2).

Figure 2:
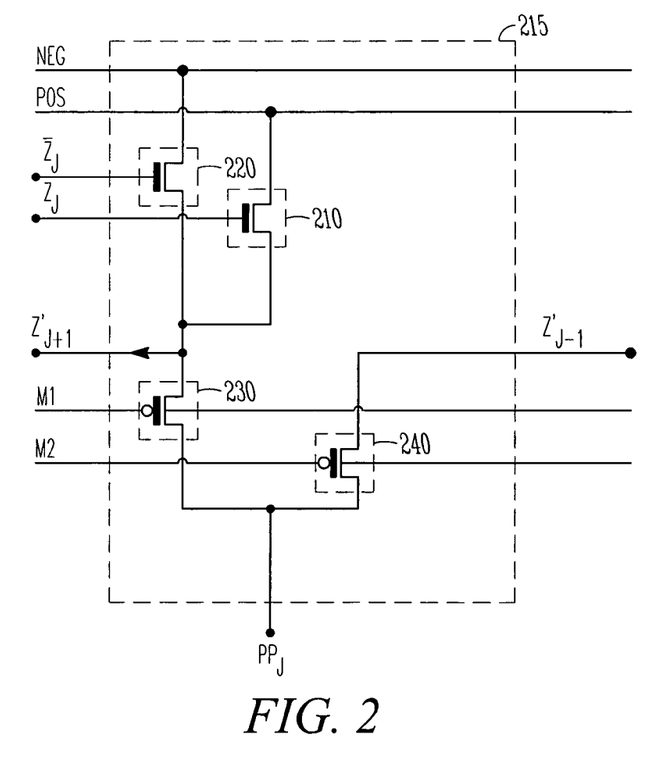
FIG. 2 is one embodiment of a multiplexer circuit for generating a partial product for multiplying using Booth encoding.

FIG. 2 is one embodiment of a multiplexer circuit 215. The circuit includes four pass gates 210, 220, 230, 240. In the circuit 215, the pass gates 210, 220, 230, 240 are shown implemented with field effect transistors (FETs). The FETs shown are N-type, but the multiplexer circuit 215 can also be implemented with P-type transistors or with bipolar transistors. In the multiplexer circuit 215, the gate of the first transistor 210 is coupled to receive a multiplicand bit $Z_j$ and the gate of the second transistor 220 is coupled to receive the complement to the multiplicand bit. The drains of the transistors 210, 220 are coupled together to provide an output $Z_{j+1}'$. The source of the first transistor 210 is coupled to the POS control signal. The source of the second transistor 220 is coupled to the NEG control signal. Because only one of $Z_j'$ or its complement is active at any one time, the two transistors implement the truth table below in Table 2. In the table, "1" denotes an active state such as high, "0" denotes an inactive state such as low, and "X" denotes a don't care state. Although the description above uses specific source and drain connections, one of ordinary skill in the art would understand the source and drain regions are interchangeable.

TABLE 2

| $Z_j$ | NEG | POS | $Z_{j+1}'$ |
|---|---|---|---|
| 0 | 0 | X | 0 |
| 0 | 1 | X | 1 |
| 1 | X | 0 | 0 |
| 1 | X | 1 | 1 |

The middle two rows of the table show that the multiplicand bit is inverted at the $Z_{j+1}'$ output by an active NEG signal or an inactive POS signal. It is also shown that if the NEG and POS control signals are both inactive, the $Z_{j+1}'$ output is necessarily "0." FIG. 2 also shows that the intermediate output $Z_{j+1}'$ is provided to a next higher order multiplexer stage. The drains of the third and fourth transistors 230, 240 are also tied together. If the control signal M1 is active, the third transistor 230 passes the $Z_{j+1}'$ drain output to the multiplexer output, $PP_j$, to effect a multiply by one of the $Z_{j+1}'$ drain output. If the M2 output is active, the fourth transistor 240 passes the $Z_{j-1}'$ intermediate output from the next lower multiplexer stage to the output to effect a left shift for the multiply by two. $Z_{j-1}'$ corresponds to $Z_{j+1}'$ from the next lower stage. The multiplexer output, $PP_j$, corresponds to one bit of the resultant partial product.

Figure 3:
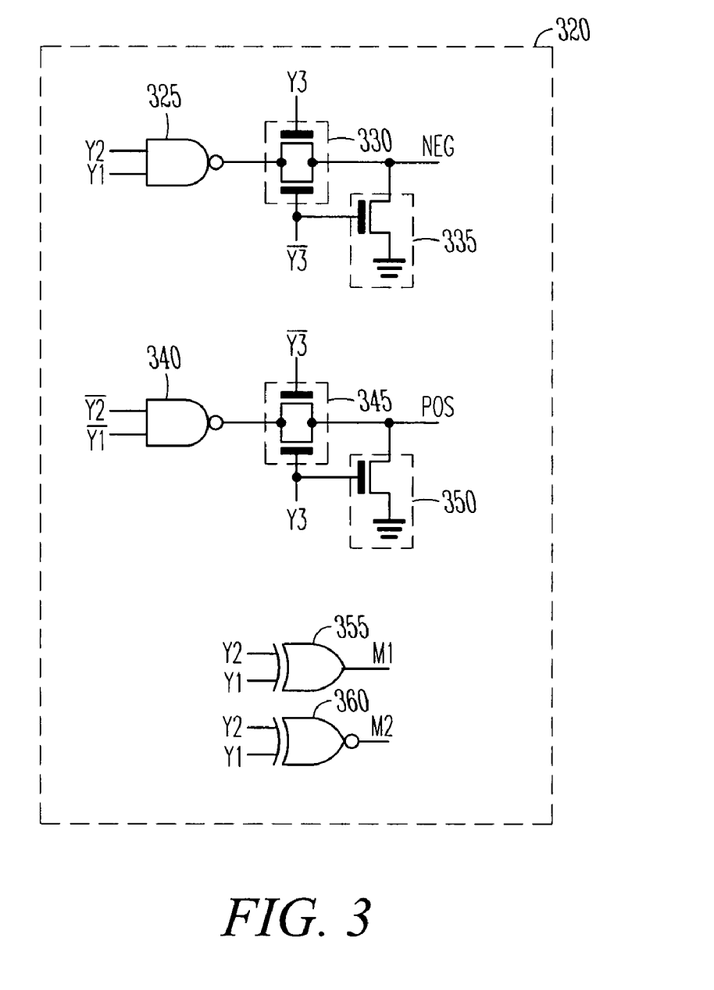
FIG. 3 shows one embodiment of a Booth encoder circuit.

FIG. 3 shows one embodiment 320 of a Booth encoder circuit. The circuit 320 uses logic circuits to encode a three-bit block of a multiplier, $y_3$, $y_2$, $y_1$ into four control signals NEG, POS, M1 and M2 corresponding to a negative result, a positive result, multiply by one and multiply by two. The Booth encoder circuit 320 is used to encode any block of three bits of the multiplier block. Although specific embodiments are discussed concerning the Booth encoder circuit 320, one skilled in the art of logic circuit design would understand from reading this description that similar logic circuits to produce the indicated control signals are within the scope of this document.

The embodiment 320 shows four logic circuits. The first logic circuit generates the NEG signal. The first logic circuit includes a two-input NAND gate 325 where the inputs to the NAND gate 325 are first and second bits $y_2$, $y_1$ of the multiplier block. The first logic circuit also includes a transmission gate, or T-gate, 330 coupled to the output of the NAND gate 325. A third multiplier bit $y_3$ and its complement activate the T-gate 330. A pull-down transistor 335 is coupled to the output of the T-gate 330. The complement of the third multiplier $y_3$ bit activates the pull down transistor 335. The output of the T-gate 330 provides the NEG signal.

A second logic circuit generates the POS signal. In the embodiment 320, the second logic circuit includes a two-input NAND gate 340, where the inputs to the NAND gate 340 are complements of the first and second bits $y_2$, $y_1$ of the multiplier block. A T-gate 345 is coupled to the output of the NAND gate 340. The third multiplier bit $y_3$ and a complement of the third multiplier bit activate the T-gate 345. The output of the T-gate 345 provides the POS signal. A pull-down transistor 350 is coupled to the output T-gate 345. The third multiplier bit $y_3$ activates the pull down transistor 350.

A third logic circuit generates the M1 signal. In the embodiment 320, the third logic circuit includes a two-input XOR gate 355, where the inputs to the XOR gate 355 are first and second bits $y_2$, $y_1$ of a multiplier block and the output of the XOR gate 355 is the M1 signal.

A fourth logic circuit generates the M2 signal. In the embodiment 320, the fourth logic includes a two-input XNOR gate 360, where the inputs to the XNOR gate 360 are first and second bits $y_2$, $y_1$ of a multiplier block and the output of the XNOR gate 360 is M2 signal.

Figure 4:
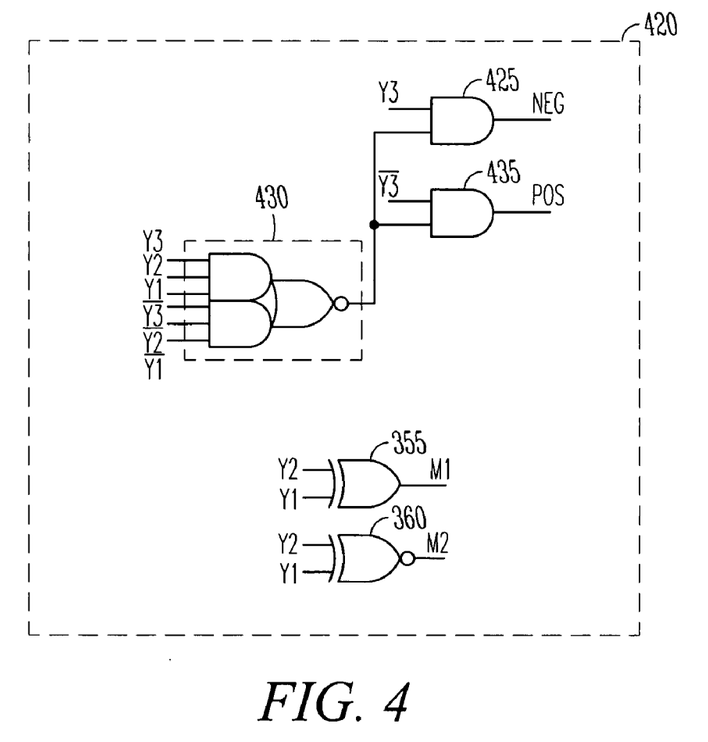
FIG. 4 shows another embodiment of a Booth encoder circuit.

FIG. 4 shows another embodiment 420 of a Booth encoder circuit. The embodiment 420 includes four logic circuits 425, 435, 355, 360 to encode the NEG, POS, M1 and M2 signals and includes a fifth logic circuit 430 that detects when the three bits $y_3$, $y_2$, $y_1$ of the multiplier block are not ones or all zeros. The first logic circuit includes a two-input AND gate 425. One input to the AND gate 425 is the output of the fifth logic circuit 430 and a second input is the third bit $y_3$ of a multiplier block. The output of the AND gate 425 provides the NEG signal. The second logic circuit includes a two-input AND gate 435. One input to the AND gate 435 is the output of the fifth logic circuit 430 and a second input is the complement of the third bit $y_3$ of a multiplier block. The output of the AND gate 435 provides the POS signal. The third and fourth logic circuits include the XOR gate 355 to provide the M1 signal and the XNOR gate 360 to provide the M2 signal as discussed previously in FIG. 3.

Figure 5:
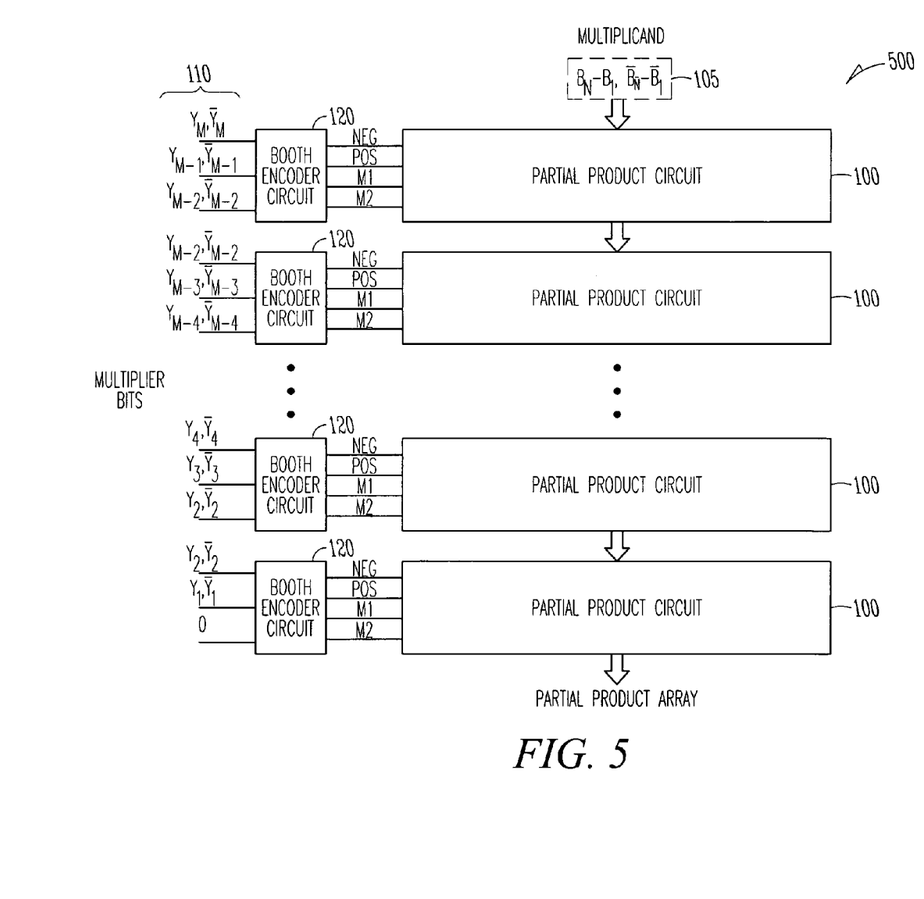
FIG. 5 is an illustration of a partial product array circuit.

FIG. 5 is an illustration of a partial product array circuit 500. The circuit 500 includes a partial product circuit 100 for each partial product required by the multiply operation. Each partial product circuit 100 includes one Booth encoder circuit 120 to encode three-bits of a multiplier block and N multiplexer circuits for each bit of the multiplicand 105. The number of partial product circuits 100 used in the array 500 is equal to one-half the number of bits in the multiplier 110. Thus, if the multiply operation requires multiplying an M-bit multiplier 110 by an N-bit multiplicand 105, the number of partial product circuits 100 is M/2. Thus the number of multiplexer circuits required is equal to M/2 times N. The letters M and N represent an integer number of bits useful in multiply circuits. Some examples include sixteen, thirty-two and sixty-four.

A multiplying operation where M and N are relatively large integers shows the advantages of a multiplexer circuit that minimizes the number of pass gates in a multiplexer. For example, an integrated circuit implementation of a multiply operation that uses a sixty-four bit multiplier and a sixty-four bit multiplicand would require 32*64 or 2048 multiplexers. Use of the four-transistor multiplexer 215 of FIG. 2 over a multiplexer that uses five transistors would save 2048 transistors on the integrated circuit.

Figure 6:
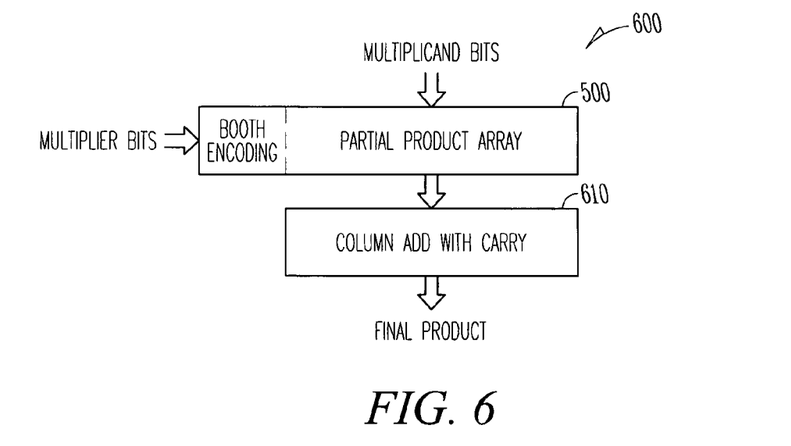
FIG. 6 is a block diagram of one embodiment of a multiply circuit that uses a partial product array circuit.

FIG. 6 is a block diagram of one embodiment of a multiply circuit 600 that uses a partial product array circuit 500. The partial product array circuit 500 receives the bits of the multiplicand and the multiplier and generates the partial products. An adder circuit 610 receives the partial products and them together along with generating any carries to form the final product.

Figure 7:
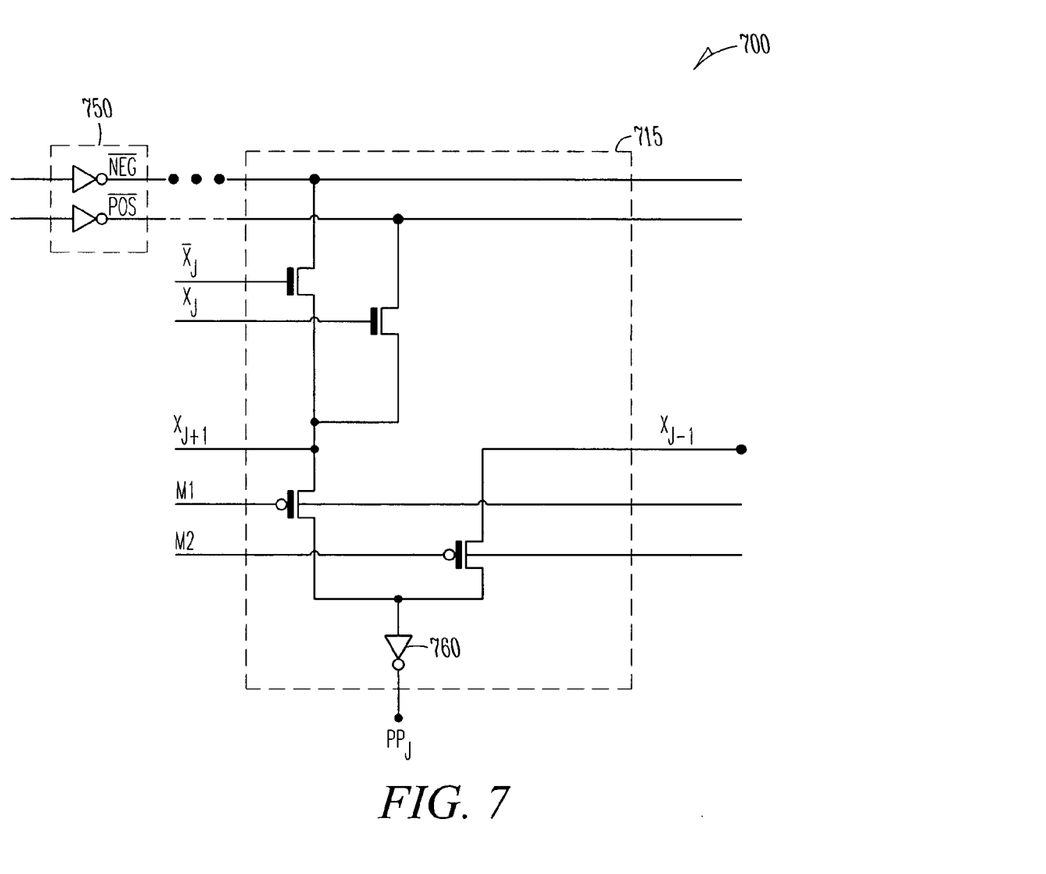
FIG. 7 is an illustration of one embodiment of a multiplexer circuit with increased fanout capability.

As the size of the multiplicand increases, the Booth control signals need to be distributed to more multiplexers. As the size of the multiplier increases, the multiplexer outputs may have to drive longer interconnect lines. FIG. 7 is an illustration of one embodiment 700 of a multiplexer circuit 715 with increased fanout capability. In the embodiment, the NEG and POS signals are inverted at the output of the Booth encoder circuit 120 using inverting buffers 750. The partial product output of the multiplexer circuit 715 is also inverted using inverting buffer 760 thus preserving the logic sense of the partial product output. In another embodiment, the buffers are non-inverting.

Figure 8:
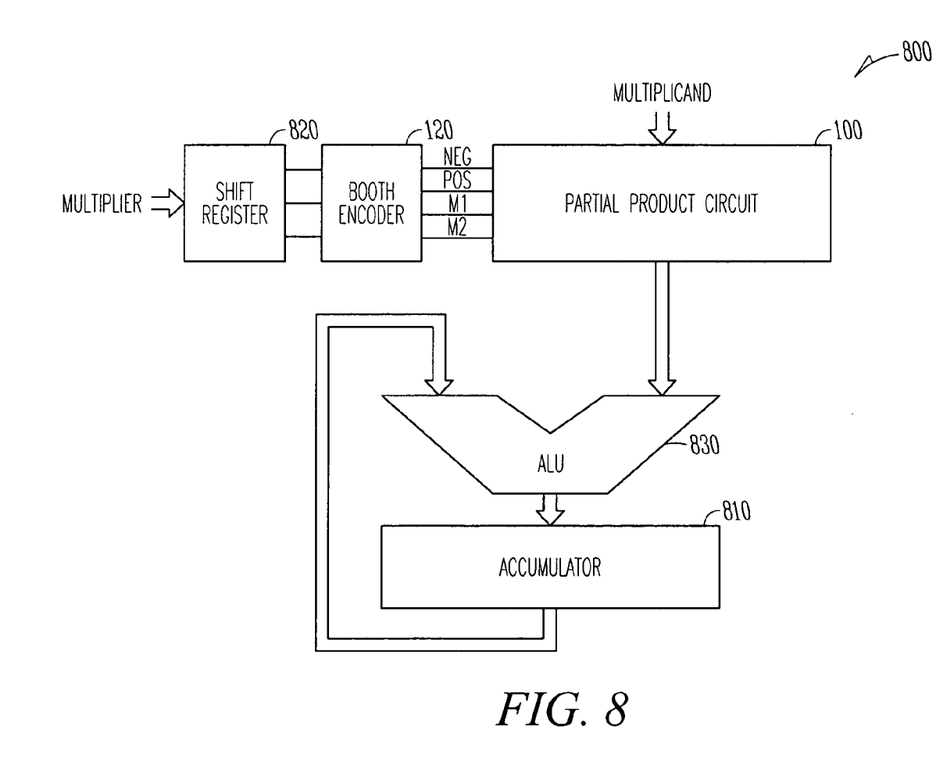
FIG. 8 is a block diagram of one embodiment of a multiply circuit that uses a partial product circuit with an accumulator.

FIG. 8 is a block diagram of one embodiment of a multiply circuit 800 that uses a partial product circuit 100 with an accumulator 810. The partial products are calculated one at a time and the intermediate results are stored in the accumulator 810. The partial product circuit 100 receives the bits of the multiplicand. A shift register 820 receives the bits of the multiplier and applies three bits of the multiplier at a time to the Booth encoder circuit 120. The partial product is then shifted if necessary and added to the accumulator 810 using the arithmetic logic unit (ALU) 830. The result is stored back into the accumulator 810. The accumulator 810 holds the final product after all of the partial products are calculated and added to the accumulator 810.

Figure 9:
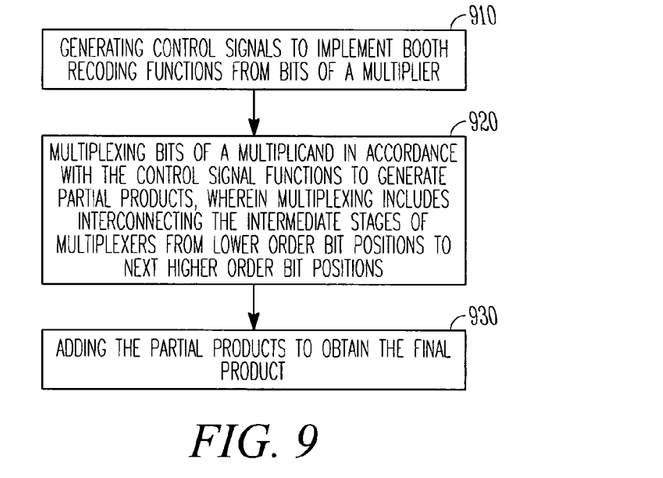
FIG. 9 shows one embodiment of a method of multiplying a multiplicand and a multiplier.

FIG. 9 is an embodiment of a method 900 of multiplying multiplicand and a multiplier. At 910, four control signals are generated to implement Booth encoding functions of negative, positive, zero, multiply by one and multiply by two, from bits of a multiplier. At 920, bits of a multiplicand are multiplexed in accordance with the control signal functions to generate partial products. The multiplexing includes interconnecting intermediate stages of multiplexers from lower order bit positions to next higher order positions. At 930, the partial products are added to obtain the final product.

Figure 10:
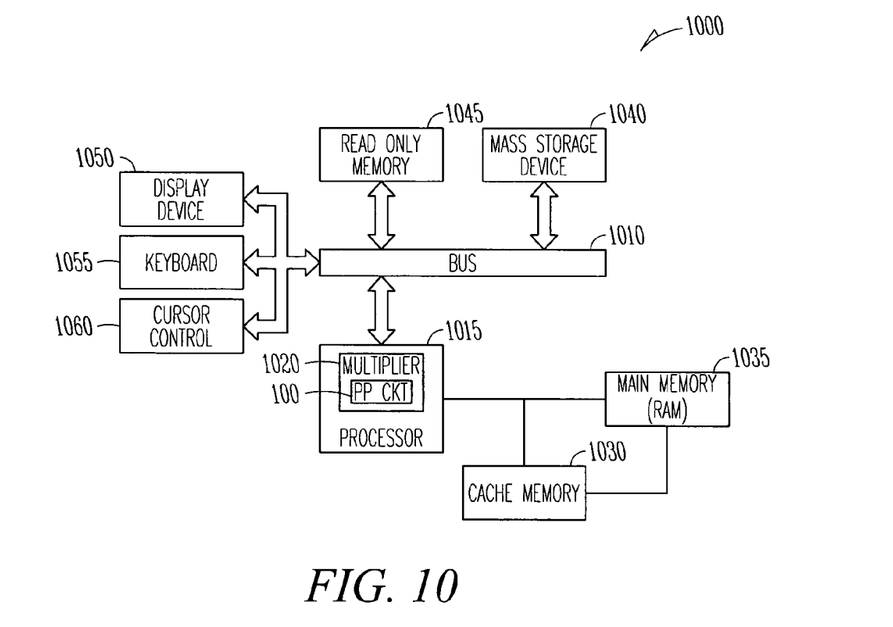
FIG. 10 shows a computer system that includes a multiply circuit.

FIG. 10 is a block diagram of one embodiment of a computer system 1000 that uses a partial product circuit 100. The computer system includes a system bus 1010 for communicating information and a processor 1015 for processing information. The processor 1015 includes a multiplier circuit 1020 that includes a partial product circuit 100 for calculating partial products of a multiply operation. A cache memory 1030 is coupled to the processor 1015 for storing information frequently used by the processor 1015, and a main memory 1035 is coupled to the processor 1015 including random access memory (RAM) for storing information and instructions, including multiply instructions, for the processor 1015.

A read only memory (ROM) 1045 or other non-volatile storage device for storing fixed information for the processor 1015 is coupled to the system bus 1010. Other components such as a mass storage device 1040, a display device 1050, a keyboard 1055 or other input device and a cursor control device 1060 may also be included in the computer system 1000.

Although specific examples have been illustrated and described herein, it will be appreciated by those of ordinary skill in the art that any arrangement calculated to achieve the same purpose could be substituted for the specific example shown. This application is intended to cover any adaptations or variations of the present invention. Therefore, it is intended that this invention be limited only by the claims and the equivalents shown.

What is claimed is:

1. A multiplier circuit, comprising:
   at least one Booth encoder circuit to encode a plurality of multiplier bits into four encoded outputs, the encoded outputs to select Booth-multiply functions; and
   a plurality of multiplexer circuits, one multiplexer circuit for each bit of the multiplicand, at least one of the plurality multiplexer circuits including four pass gates coupled to receive a multiplicand bit, a complement of the multiplicand bit, multiplexed data from a next lower order multiplexer circuit and the encoded outputs of the Booth encoder circuit to provide one bit of a partial product at a multiplexer output.

2. The multiplier circuit of claim 1, wherein the four encoded outputs select Booth-multiply functions which include negative, positive, multiply by one and multiply by two.

3. The multiplier circuit of claim 1, wherein the multiplier circuit includes M/2 Booth encoder circuits each coupled to a plurality of multiplexer circuits, each Booth encoder circuit receiving three bits of an M-bit multiplier to output M/2 Booth-multiply partial products.

4. The multiplier circuit of claim 3, wherein the multiplier circuit further includes an adder circuit coupled to the outputs of the multiplexers to add the partial products and obtain a product of the multiply operation.

5. The multiplier circuit of claim 3 further including a N-bit multiplicand, wherein M and N are integers selectable from one or a combination of sixteen, tiny-two and sixty-four.

6. The multiplier of claim 1, wherein the Booth encoder circuit includes at least one fanout driver circuit to drive at least one select output and the outputs of the multiplexer circuits include fanout drivers to drive the partial product bits.

7. The multiplier circuit of claim 6, wherein the fanout drivers include inverters.

8. A plurality of multiplexer circuits, each multiplexer circuit including four transistors, the transistors coupled to receive Booth encoded signals, a multiplicand bit, a complement of the multiplicand bit, and at least one of the multiplexer circuits coupled to receive multiplexed data from a next lower order multiplexer circuit, wherein one bit of a partial product is selected for output from the at least one multiplexer circuit according to the Booth encoded signals.

9. The circuit of claim 8, wherein the four transistors include:
   first and second transistors, the gates of the transistors coupled to receive a multiplicand bit and its complement, a first source/drain region of the transistors coupled to receive first and second Booth encoded signals and a second source/drain region of the transistors coupled together and coupled to the input of a next higher order multiplexer, the coupled second source/drain regions to provide a positive or a negative multiplicand bit according to the first and second Booth encoded signals; and a third transistor, a first source/drain region of the third transistor coupled to the second source/drain regions of the first and second transistors, the gate of the third transistor coupled to receive a third Booth encoded signal, and a second source/drain region of the third transistor providing an output corresponding to one bit of a partial product; and a fourth transistor, a first source/drain region of the fourth transistor to receive multiplexed data from a next lower order multiplexer; the gate of the fourth transistor to receive a fourth Booth encoded signal, a second source/drain region of the fourth transistor coupled to the second source/drain region of the third transistor, the coupled second source/drain regions to provide one bit of a partial product according to the third and fourth Booth encoded signals.

10. The circuit of claim 8, wherein the Booth encoded signals include four Booth encoded signals encoded from three bits of a multiplier and which select Booth-multiply functions that include negative, positive, multiply by two and multiply by one.

11. The circuit of claim 10, wherein a multiplexer output is zero when both the positive and negative result signals are low.

12. The circuit of claim 8, wherein a delay from a multiplicand bit to an output of the circuit is a maximum of two transistor delays.

13. The circuit of claim 8, wherein the transistors include NFBT transistors.

14. A Booth encoder circuit comprising:
a plurality of logic circuits to generate control signals used to generate Boot-multiply partial products, the logic circuits only including:
a first logic circuit to generate a signal for a negative partial product;
a second logic circuit to generate a signal for a positive partial product;
a third logic circuit to generate a signal to multiply a multiplicand by two; and
a fourth logic circuit to generate a signal to multiply a multiplicand by one.

15. The circuit of claim 14, wherein the Booth encoder circuit generates a zero partial product when outputs of the first and second logic circuits are both low.

16. The circuit of claim 14, wherein inputs to the logic circuits include bits of a multiplier and complements of the bits of a multiplier.

17. The circuit of claim 16, wherein the first logic circuit comprises:
a two-input NAND gate, wherein the inputs to the NAND gate are first and second bits of a multiplier;
a T-gate coupled to the output of the NAND gate, wherein a third multiplier bit and a complement of the third multiplier bit activate the T-gate, and wherein the output of the T-gate includes the signal for a negative partial product; and
a pull-down transistor coupled to the output T-gate, wherein the complement of the third multiplier bit activates the pull down transistor.

18. The circuit of claim 16, wherein the first logic circuit comprises:
a fifth logic circuit that is high when first, second and third bits of a multiplier are not all ones or all zeros; and a two-input AND gate, wherein a first input to the AND gate is the output of the fifth logic circuit and a second input is the third bit of a multiplier.

19. The circuit of claim 16, wherein the second logic circuit comprises:
a two-input NAND gate, wherein the inputs to the NAND gate are complements of first and second bits of a multiplier;
a T-gate coupled to the output of the NAND gate, wherein a third multiplier bit and a complement of the third multiplier bit activate the T-gate, and wherein the output of the T-gate includes a signal for the positive partial product; and
a pull-down transistor coupled to the output T-gate, wherein the third multiplier bit activates the pull down transistor.

20. The circuit of claim 16, wherein the second logic circuit comprises:
a fifth logic circuit that is high when first, second and third bits of a multiplier are not all ones or all zeros; and
a two-input AND gate, wherein a first input to the AND gate is the output of the fifth logic circuit and a second input is a complement of the third bit of a multiplier.

21. The circuit of claim 16, wherein the third logic circuit comprises a two-input XOR gate, wherein the inputs to the XOR gate are first and second bits of a multiplier and the output of the XOR gate is the signal to multiply a multiplicand by one.

22. The circuit of claim 16, wherein the fourth logic circuit comprises a two-input XNOR gate, wherein the inputs to the XNOR gate are first and second bits of a multiplier and the output of the XNOR gate is the signal to multiply a multiplicand by two.

23. A computer system comprising:
a bus that communicates information;
a memory coupled to the bus, the memory to store a multiply instruction; and
a processor coupled to the bus, the processor to process information, the processor including a multiplier circuit, the multiplier circuit including at least one partial product generator, wherein the at least one partial product generator includes:
a Booth encoder circuit to encode a plurality of multiplier bits into four encoded outputs, the encoded outputs to select Booth-multiply functions; and
a plurality of multiplexer circuits, one multiplexer circuit for each bit of the multiplicand, at least one of the plurality of multiplexer circuits including:
four pass gates, the pass gates coupled to a multiplicand bit, a complement of the multiplicand bit, multiplexed data from a next lower order multiplexer circuit and the Booth encoder circuit outputs, the Booth encoder circuit outputs to enable one or a combination of the pass gates to provide one bit of a partial product at a multiplexer output.

24. The computer system of claim 23, wherein the Booth encoder select outputs to enable the functions positive, negative, zero, multiply by one and multiply by two.

25. The computer system of claim 24, wherein the multiplier circuit implements a sixty-four by sixty-four bit multiply.

* * * * *

UNITED STATES PATENT AND TRADEMARK OFFICE
CERTIFICATE OF CORRECTION

PATENT NO. : 7,308,470 B2 Page 1 of 1
APPLICATION NO. : 10/728395
DATED : December 11, 2007
INVENTOR(S) : Ng It is certified that error appears in the above-identified patent and that said Letters Patent is hereby corrected as shown below:

Column 6, line 41, in Claim 5, delete "tiny" and insert -- thirty --, therefor.

Column 7, line 32, in Claim 13, delete "NFBT" and insert -- NFET --, therefor.

Column 7, line 35, in Claim 14, delete "Boot" and insert -- Booth --, therefor.

Signed and Sealed this

Twentieth Day of May, 2008

JON W. DUDAS
*Director of the United States Patent and Trademark Office*